United States Patent
Tate et al.

(10) Patent No.: US 9,973,919 B2
(45) Date of Patent: May 15, 2018

(54) HANDHELD DEVICES CONFIGURABLE FOR LOCATION-DEPENDENT COMMUNICATIONS RESOURCES

(71) Applicant: Essential Products, Inc., Palo Alto, CA (US)

(72) Inventors: Joseph Anthony Tate, San Jose, CA (US); Xinrui Jiang, San Jose, CA (US); Andrew E. Rubin, Los Altos, CA (US); Matthew Hershenson, Los Altos, CA (US); Xiaoyu Miao, Palo Alto, CA (US); David John Evans, V, Palo Alto, CA (US); Jason Sean Gagne-Keats, Cupertino, CA (US); Rebecca Schultz Zavin, Portola Valley, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days. days.

(21) Appl. No.: 15/410,969

(22) Filed: Jan. 20, 2017

(65) Prior Publication Data
US 2017/0374541 A1   Dec. 28, 2017

Related U.S. Application Data

(60) Provisional application No. 62/353,540, filed on Jun. 22, 2016.

(51) Int. Cl.
*H04W 24/00* (2009.01)
*H04W 8/06* (2009.01)
(Continued)

(52) U.S. Cl.
CPC .............. *H04W 8/06* (2013.01); *H01Q 1/243* (2013.01); *H01Q 5/49* (2015.01); *H04W 4/025* (2013.01)

(58) Field of Classification Search
None
See application file for complete search history.

(56) References Cited

U.S. PATENT DOCUMENTS

2004/0196834 A1* 10/2004 Ofek ...................... H01Q 1/246
                                                           370/352
2012/0108204 A1*  5/2012 Schell ................... H04W 8/205
                                                           455/411

(Continued)

FOREIGN PATENT DOCUMENTS

| DE | EP2111065 A1 * 10/2009 |
| WO | 0162034 A1 8/2001 |
| WO | 2015019776 A1 2/2015 |

OTHER PUBLICATIONS

Raith-WO_01_62034_A1.*

(Continued)

*Primary Examiner* — Jinsong Hu
*Assistant Examiner* — Alexander Yi
(74) *Attorney, Agent, or Firm* — Perkins Coie LLP

(57) ABSTRACT

A handheld device can include antenna elements and a housing. The housing can include a processor, communications circuitry communicatively coupled to the plurality of antenna elements and the processor, and memory including instructions executable by the processor. The executable instructions can cause the handheld device to estimate a geographic location of the handheld device, configure the communications circuitry and/or the antenna elements for a communications resource. The communications resource can be selected based on the geographic location of the handheld device. The handheld device can be further caused to enable access to a wireless network by using the communication circuitry and the antenna elements as configured in accordance with the communications resource.

16 Claims, 6 Drawing Sheets

(51) Int. Cl.
*H01Q 1/24* (2006.01)
*H04W 4/02* (2018.01)
*H01Q 5/49* (2015.01)

(56) References Cited

U.S. PATENT DOCUMENTS

| | | | | |
|---|---|---|---|---|
| 2012/0108206 A1* | 5/2012 | Haggerty | ............. | H04W 12/06 |
| | | | | 455/411 |
| 2016/0006861 A1* | 1/2016 | Hodges | ............. | H04M 1/72577 |
| | | | | 455/405 |
| 2016/0183275 A1* | 6/2016 | Inoue | .................. | H04B 7/0695 |
| | | | | 455/450 |

OTHER PUBLICATIONS

International Search Report and Written Opinion dated Jul. 17, 2017, for International Application No. PCT/US2017/37507, 16 pages.
Office Action and Search Report dated Mar. 20, 2018 for Taiwan Patent Application No. 106120283 of Essential Products, Inc.

* cited by examiner

HANDHELD DEVICES CONFIGURABLE FOR LOCATION-DEPENDENT COMMUNICATIONS RESOURCES

CROSS REFERENCE TO RELATED APPLICATIONS

This application claims the benefit of U.S. Provisional Patent Application No. 62/353,540, filed Jun. 22, 2016, which application is incorporated herein in its entirety.

TECHNICAL FIELD

The teachings disclosed herein relate generally to configuring or reconfiguring handheld devices for communications resources, and more particularly relate to configuring or reconfiguring handheld devices for communications resources based on geographic locations of the handheld devices.

BACKGROUND

A handheld device is a small computing device such as a smartphone or wearable electronic device. A typical handheld device includes complex communications circuitry and other components configured to access wireless networks and other devices. The communications circuitry is communicatively coupled to numerous antennas used to transmit and/or receive radio frequency (RF) signals or other signals. Each antenna is a relatively complex structure that is physically constrained by the size of the handheld device and functionally constrained by a wireless service provider and regulatory agencies. Each antenna is specifically designed to support particular protocols and frequencies.

Examples of antennas include a primary cellular antenna, a diversity cellular antenna, a Global Positioning System (GPS) antenna, a Wi-Fi antenna, a Bluetooth antenna, a near field communication (NFC) antenna, etc. For example, a GPS antenna enables the handheld device to receive signals used to determine a geographic location of the handheld device, which is commonly used for navigation and location-based services.

A handheld device subscribes to a wireless communications service provider (i.e., wireless carrier) that provides access to a wireless network in a limited geographical coverage area commonly referred to as a "home" network. When roaming outside the home network, the handheld device can typically hop onto another wireless service provider's network, if available. However, the performance and costs associated with a visited network can be unpredictable or undesirable and, as such, existing handheld devices continue to have limited access to communications networks.

SUMMARY

The technique introduced here includes at least one apparatus and at least one method. The at least one apparatus can be a handheld device including antenna elements and a housing. The housing can include a processor, communications circuitry communicatively coupled to the plurality of antenna elements and the processor, and memory including instructions executable by the processor. The executable instructions can cause the handheld device to estimate a geographic location of the handheld device and configure the communications circuitry and/or the antenna elements for a communications resource. The communications resource can be selected based on the geographic location of the handheld device. The handheld device can be further caused to enable access to a wireless network by using the communication circuitry and the antenna elements as configured in accordance with the communications resource.

In some embodiments, a method is performed by a handheld device. The handheld device can include a housing, antenna elements communicatively coupled to communications circuitry, a processor, and a memory collectively operable to enable access to a wireless network. The method can include estimating a geographic location of the handheld device and configuring at least one of the communications circuitry or the antenna elements for a communications resource. The communications resource can be selected based on the estimated geographic location of the handheld device. The method can further include enabling access to a wireless network by utilizing the communication circuitry and the antenna elements as configured in accordance with the communications resource.

In some embodiments, another method is performed by a handheld device. The handheld device can include a housing, a processor, a memory, and communications circuitry communicatively coupled to the processor and memory to enable access to a wireless network. The method can include estimating a geographic location of the handheld device, designating a wireless communications service provider from among multiple wireless communications service providers based on the estimated geographic location, and configuring the communications circuitry to enable access to the wireless network by employing a service of the designated wireless communications service provider.

Other aspects of the technique will be apparent from the accompanying figures and detailed description.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

DETAILED DESCRIPTION

Figure 1:
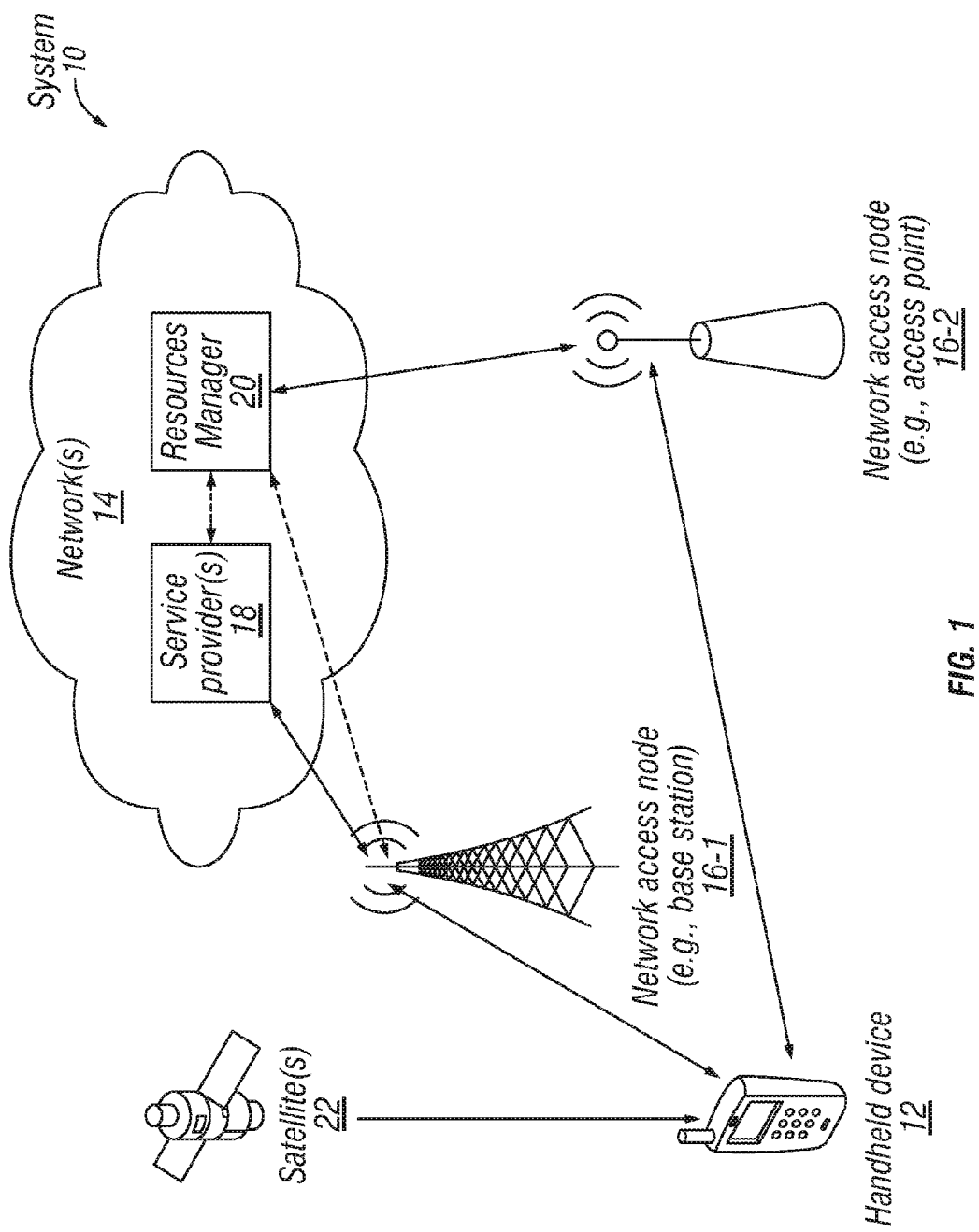
FIG. 1 is a block diagram illustrating a communications system according to some embodiments of the present disclosure.

The embodiments set forth below represent the necessary information to enable those skilled in the art to practice the embodiments and illustrate the best mode of practicing these embodiments. Upon reading the following description in light of the accompanying figures, those skilled in the art will understand the concepts of the disclosure and will recognize applications of these concepts that are not particularly addressed here. It should be understood that these concepts and applications fall within the scope of the disclosure and the accompanying claims.

The purpose of the terminology used here is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating" or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, the terms "connected," "coupled," or variants thereof, refer to any connection or coupling, either direct or indirect, between two or more elements. The coupling or connection between the elements can be physical, logical, or a combination thereof.

The disclosed embodiments include techniques performed by a handheld device to automatically configure or reconfigure communications circuitry and/or antenna elements (collectively forming an antenna) in accordance with one or more selected communications resources. Examples of the communications resources include wireless communications service providers, protocols, frequency bands, and frequencies.

The communications resources can be selected from among multiple communications resources based on an estimated geographic location of a handheld device and/or values of other communications resources parameters such as a data rate, quality of service, and cost of use. For example, the handheld device can estimate its geographic location from received global positioning system (GPS) signals. A service provider, protocol, frequency band, and/or frequency can be selected based on the estimated geographic location and/or a data rate, quality of service, or cost of use, which could also have values dependent on the estimated geographic location.

The handheld device is enabled to access wireless communications networks by using the communications circuitry and the antenna elements as configured in accordance with the selected communications resources. As such, a handheld device can be optimized for local service providers, bands, protocols, and/or frequencies.

For example, the antenna elements can be discrete structures integrated into a housing of the handheld device for radiating radio frequency (RF) signals. The antenna elements can be separately and/or collectively addressable to optimize access to a local wireless network. For example, software can implement various loading and tuning routines for automatically switching the antenna elements to form various antenna types.

FIG. 1 is a block diagram illustrating a communications system according to some embodiments of the present disclosure. As shown, the communications system 10 (hereinafter the "system 10") includes components such as a handheld device 12 and one or more networks 14. The handheld device 12 is communicatively coupled to the network(s) 14 via network access nodes 16-1 and 16-2 (referred to collectively as network access nodes 16).

The handheld device 12 is any type of electronic device that can communicate wirelessly with a network node and/or with another handheld device in a cellular, computer, and/or mobile communications system. Examples of a handheld device include smartphones (e.g., Apple iPhone, Samsung Galaxy, Nokia Lumina), tablet computers (e.g., Apple iPad, Samsung Note, Amazon Fire, Microsoft Surface), wireless devices capable of machine-to-machine (M2M) communication, wearable electronic devices, and any other handheld device that is capable of accessing the network(s) 14. Although only one handheld device 12 is shown in FIG. 1, the disclosed embodiments may include any number of handheld devices.

The handheld device 12 may store and transmit (e.g., internally and/or with other electronic devices over a network) code (composed of software instructions) and data using machine-readable media, such as non-transitory machine-readable media (e.g., machine-readable storage media such as magnetic disks, optical disks, read only memory (ROM), flash memory devices, and phase change memory) and transitory machine-readable transmission media (e.g., electrical, optical, acoustical, or other forms of propagated signals, such as carrier waves or infrared signals).

The handheld device 12 can include hardware such as one or more processors coupled to one or more other components, such as non-transitory machine-readable media to store code and/or data, user input/output (I/O) devices (e.g., a keyboard, a touchscreen, and/or a display), and network connections (e.g., an antenna) to transmit code and/or data using propagating signals. The coupling of the processor(s) and other components is typically through one or more busses and bridges (also referred to as bus controllers). Thus, a non-transitory machine-readable medium of a given electronic device typically stores instructions for execution on processor(s) of that electronic device. One or more parts of an embodiment of the present disclosure may be implemented using different combinations of software, firmware, and/or hardware.

The network access nodes 16 can be any type of radio network node that may communicate with a wireless device (e.g., handheld device 12) and/or with another network node. The network access nodes 16 may be a network device or apparatus. Examples of network access nodes include a base station (e.g., network access node 16-1), an access point (e.g., network node 16-2), or any other type of network node such as a network controller, radio network controller (RNC), base station controller (BSC), a relay, transmission points, and the like.

The system 10 depicts different types of wireless access nodes 16 to illustrate that the handheld device 12 may access different types of networks through different types of network access points. For example, a base station (e.g., the network access node 16-1) can provide access to a cellular telephone system of the network(s) 14. In contrast, an access point (e.g., the network access node 16-2) is a transceiver that provides access to a computer system of the network(s) 14.

The network(s) 14 may include any combination of private, public, wired, or wireless systems such as a cellular telephone network, a computer network, the Internet, and the like. Any data communicated over the network(s) 14 may be encrypted or unencrypted at various locations or along different portions of the networks. Examples of wireless systems include Wideband Code Division Multiple Access (WCDMA), High Speed Packet Access (HSPA), WiMax, Wi-Fi, Wireless Local Area Network (WLAN), and Global System for Mobile Communications (GSM), GSM Enhanced Data Rates for Global Evolution (EDGE) Radio Access Network (GERAN), and other systems that may also benefit from exploiting the scope of this disclosure.

The system 10 may use a variety of communications standards, protocols, number of frequency bands, frequencies, and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), 3rd Generation Partnership Project (3GPP) related standards, Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed.

The system 10 includes one or more wireless communications service providers 18 (also referred to as "service providers 18" and individually as "service provider 18") that can provide wireless communications services to access one or more networks of the network(s) 14 by the handheld device 12. Each service provider 18 owns or controls all the elements necessary to sell and deliver services to an end user (e.g., user of the handheld device 12) including radio spectrum allocation, wireless network infrastructure, back haul infrastructure, billing, customer care, provisioning computer systems and marketing and repair organizations. Although shown as being included in the network(s) 14, the service providers 18 can be located anywhere in the system 10 to control the necessary elements for service delivery.

The system 10 includes a communications resources manager 20 (hereafter "resources manager 20") that is operable to facilitate techniques performed by a handheld device to automatically configure (or reconfigure) communications circuitry and/or antenna elements in accordance with one or more selected communications resources. As used herein, "communications resources" refers to any resource used to enable and/or maintain access to a communications network. Examples of communications resources include service providers, protocols, frequency bands, frequencies, communications settings, services, software, hardware, etc.

In some embodiments, the resources manager 20 may include any number of server computers communicatively coupled to the handheld device 12 via the network access nodes 16. As such, the resources manager 20 may include combinations of hardware and/or software to process data, perform functions, communicate over the network(s) 14, and the like. For example, server computers of the resources manager 20 may include a processor, memory or storage, a transceiver, a display, operating system and application software, and the like. Other components, hardware, and/or software included in the system 10 that are well known to persons skilled in the art are not shown or discussed herein for brevity. Moreover, although shown as being included in the network(s) 14, the resources manager 20 can be located anywhere in the system 10 to facilitate techniques of the disclosed technologies.

In some embodiments, the resources manager 20 may be communicatively coupled to the service providers 18 used to facilitate access to the network(s) 14. As such, the resources manager 20 can communicate data to facilitate configuring (or reconfiguring) the handheld device 12 to enable access by the handheld device 12 to the network(s) 14. For example, the resources manager 20 can facilitate identifying and/or selecting a service provider from the service providers 18 and provide a corresponding electronic subscriber identification module (eSIM) to the handheld device 12. This enables access to the network(s) 14 by the handheld device 12 using the selected service provider.

A subscriber identification module (SIM) is typically a physical smart card mounted to a slot inside a mobile phone (e.g., handheld device 12) that enables access to services from a service provider (e.g., service provider 18). Requiring a SIM card to access services from a service provider may be undesirable because the SIM card slot tends to make handheld devices bulky and costly. It also necessitates management of SIM card inventories and distribution by the manufacturer or service provider. Moreover, a SIM card cannot be implemented everywhere in the world because of strict service provider specifications, and each SIM card can only access a single service provider.

An eSIM (also referred to as a virtual SIM) provides an improved way to give users the ability to purchase and use wireless network services. An eSIM does not require a physical SIM card, but instead is capable of being downloaded over-the-air via a wireless connection such as Wi-Fi or a cellular connection. For example, the resources manager 20 can include a cloud-based platform with a database that enables handheld devices to discover and/or use services from multiple service providers.

In some embodiments, the resources manager 20 can select from among multiple types of communications resources based on an estimated geographic location of the handheld device 12 and/or values of other parameters such as a data rate, quality of service, and/or cost of use stored in a database accessible by the handheld device 12. For example, the handheld device can estimate the geographic location of the handheld device from global positioning system (GPS) signals received from the GPS satellites 22.

However, the embodiments are not limited to using GPS signals to estimate a geographic location of the handheld device 12. Instead, any method known, being developed, or not yet developed may be used by the handheld device 12 to estimate its geographic location. As such, communications resources such as a service provider, protocol, frequency band, and/or frequency can be selected based on the estimated geographic location and/or other communications resources parameters such as a data rate, quality of service, or cost of use, which could also have values dependent on the estimated geographic location.

The handheld device 12 can be enabled to access any of the network(s) 14 by using the communications circuitry and the antenna elements as configured in accordance with the selected communications resources. Accordingly, the handheld device 12 can be optimized for local service providers, bands, protocols, frequencies, and/or to comply with local laws or regulations. For example, antenna elements of the handheld device 12 can be separately and/or collectively addressable to optimize access to a local wireless network. In particular, software can implement various loading and tuning routines for automatically switching the antenna elements to form various antenna types for connection to a communications network.

Figure 2:
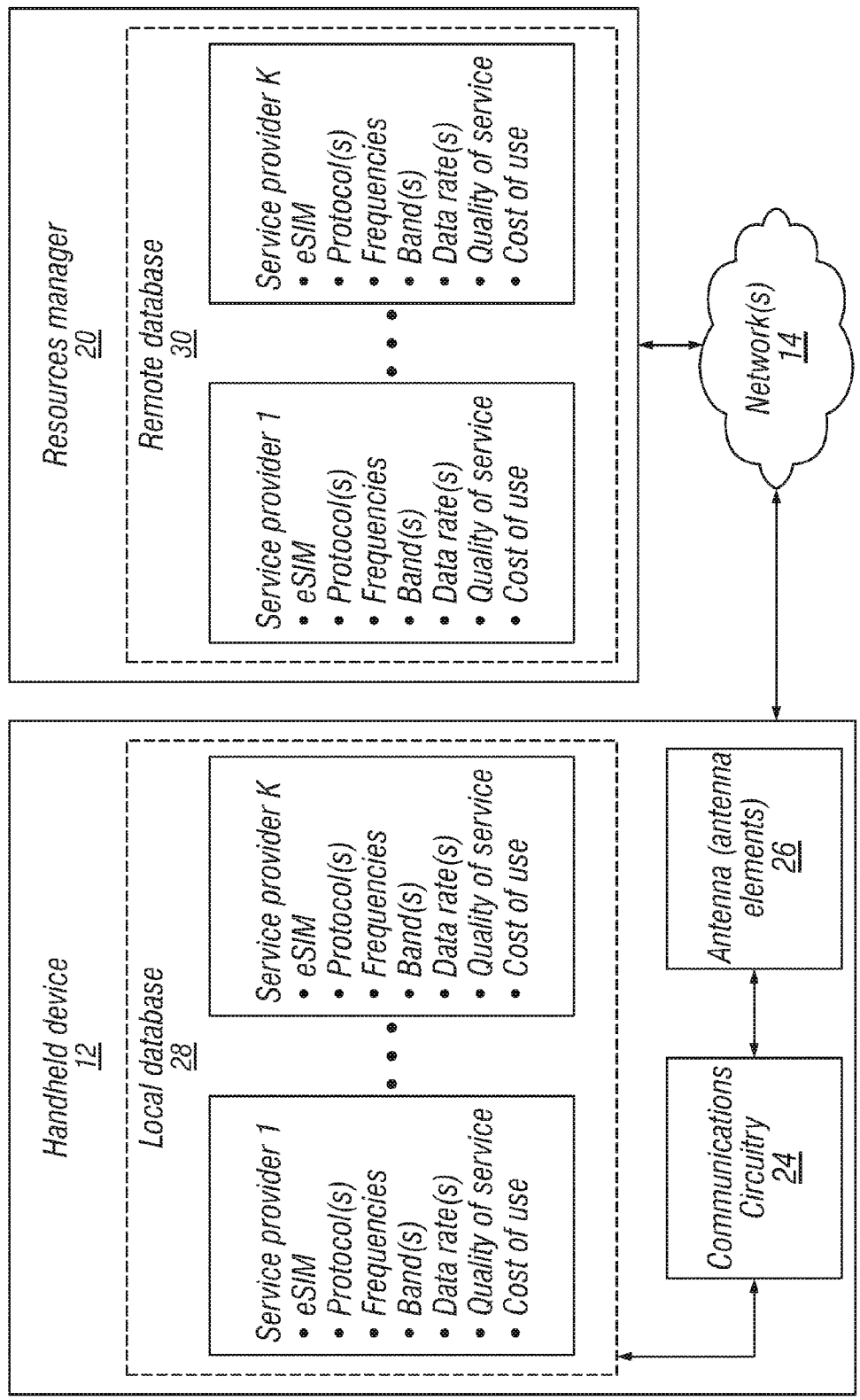
FIG. 2 is a block diagram illustrating local and remote databases of communications resources used to configure a handheld device for optimal wireless communications according to some embodiments of the present disclosure.

FIG. 2 is a block diagram illustrating local and remote databases containing data related to communications resources used to configure the handheld device 12 for optimal wireless communications according to some embodiments of the present disclosure. As shown, the handheld device 12 includes communications circuitry 24 communicatively coupled to an antenna (collectively formed from antenna elements 26).

As used herein, the term "communications circuitry" refers to the circuitry included in the handheld device 12 that processes electromagnetic signals (e.g., radio frequency (RF) signals) or at least contributes to the control of an antenna used to transmit or receive the electromagnetic signals. As used herein, the terms "antenna" and "antenna element" are used interchangeably to refer to a conductive element that forms an antenna that can transmit or receive electromagnetic signals. For example, the conductive elements of a dipole antenna are antenna elements. In some embodiments, the antenna elements can be integrated with the housing of the handheld device 12.

In some embodiments, the handheld device 12 includes a local communications resource database 28 (hereinafter the "local database 28"). The local database 28 can contain a list of communications resources and related values. As shown, the local database includes 1 though K service providers. Each service provider can be associated with communications resources such as an eSIM and/or one or more protocol(s), frequencies, frequency band(s), data rate(s), quality of service (QoS), costs, etc. Each of these communications resources can have corresponding values such as a particular eSIM, protocol, frequency, frequency band, data rate, QoS, or cost of use.

In some embodiments, any of the communications resources can be associated with a geographic location. For example, any number of service providers can be designated for the same or different geographic locations. In some embodiments, the values of the communications resources are retrieved from third-party sources such as from social media networks. The values may be updated periodically or in real-time. For example, the QoS value for a service provider may be a statistical value determined from consumers that reported a QoS value (e.g., "good," "fair," or "poor") on a social media website. In contrast, existing mobile devices determine a QoS value through trial and error measurements, which can needlessly consume resources and deplete power sources.

In some embodiments, the resource manager 20 may include a remote communications database 30 (hereinafter the "remote database 30"). The contents of the local database 28 and the remote database 30 may be the same or different. Accordingly, the system 10 may include either or both the local database 28 and the remote database 30, which can supply communications resources and related data to the handheld device 12. In some embodiments, the local database 28 is stored in a local memory of the handheld device 12. Accordingly, the contents of the local database 28 can be accessed by the handheld device 12 independent of the resources manager 20 (e.g., while disconnected from any network). In contrast, the remote database 30 is stored in a memory of the resources manager 20 (e.g., a server). The contents of the remote database 28 may be accessible by the handheld device 12 over the network(s) 14.

Accordingly, the local database 28 or remote database 30 allow the handheld device 12 to automatically configure (or reconfigure) the communications circuitry 24 and/or antenna elements 26 in accordance with communications resource(s), which could be selected based on the geographic location of the handheld device 12 and/or values of communications resources stored in a database.

For example, the handheld device 12 can select a local service provider from among multiple available local service providers listed in the local database 28. The selection can be based on an available optimal data rate, QoS, or cost of use, for example. The handheld device 12 is thus enabled to access the network(s) 14 by using the communications circuitry 24 and the antenna elements 26 as configured for particular service providers, bands, protocols, and/or frequencies.

In some embodiments, configuring or reconfiguring the handheld device 12 for communications resources may involve local laws or regulations. For example, a geographic area can be within a legal jurisdiction that prohibits or limits the use of certain protocols, bands, frequencies, types or degrees of encryption, etc. for communications by the wireless device 12. To comply with or accommodate local laws or regulations, the local database 28 and/or remote database 28 may include information about relevant laws and regulations for different geographic locations. As such, the handheld device 12 can access information about local laws and regulations to ensure that the handheld device 12 is configured (or reconfigured) as required by local laws or regulations.

Figure 3:
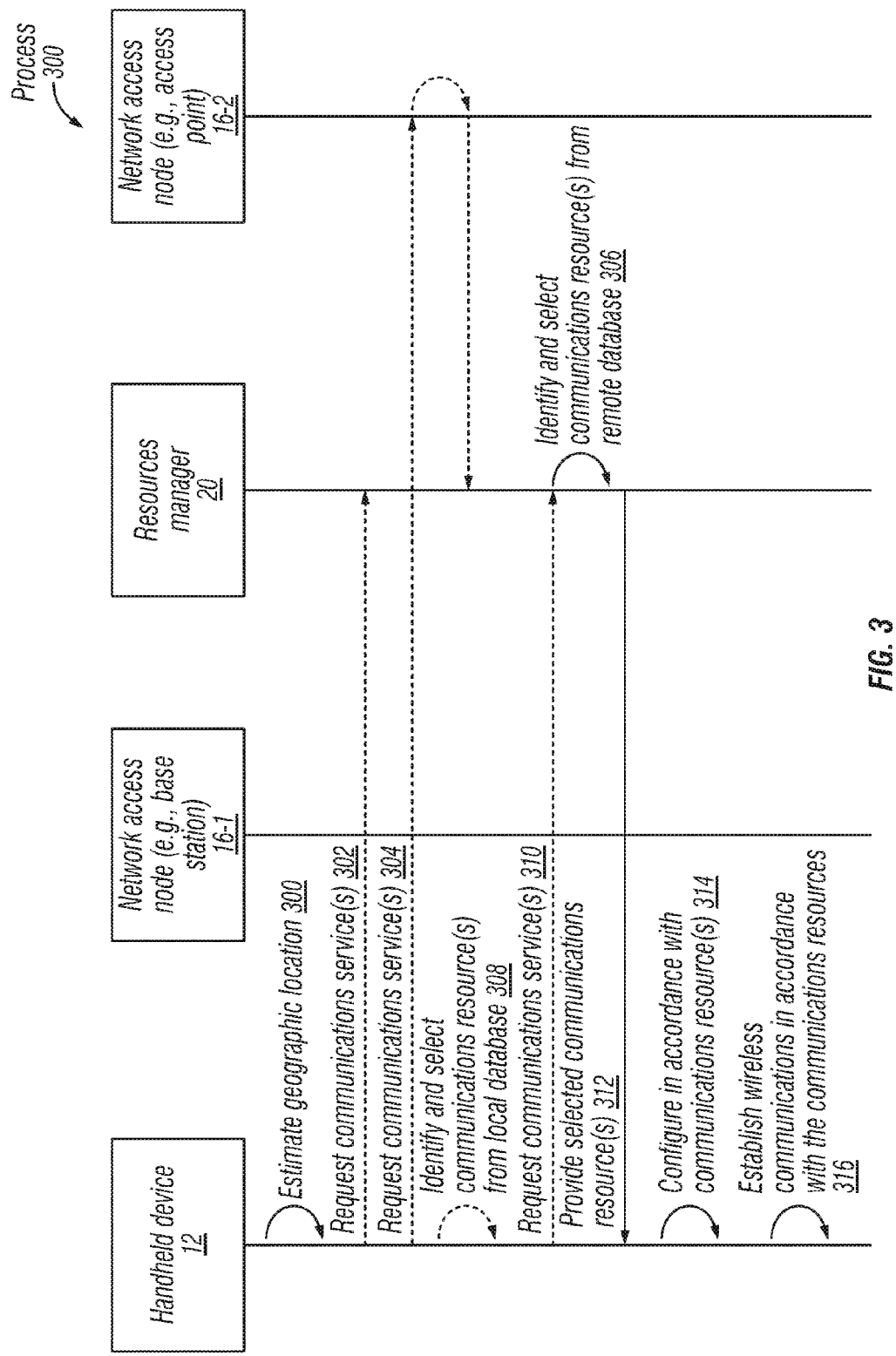
FIG. 3 is a sequence diagram illustrating a process for enabling access to a wireless network by configuring a handheld device in accordance with communications resources according to some embodiments of the present disclosure.

FIG. 3 is a sequence diagram illustrating a process 300 for enabling access to the network(s) 14 by configuring the handheld device 12 in accordance with communications resources according to some embodiments of the present disclosure. In step 302, the handheld device 12 estimates its geographic location. For example, the handheld device can estimate its geographic location from global positioning system (GPS) signals received from the satellite(s) 22.

In steps 302 or 304, the handheld device 12 can request one or more communications services from the resources manager 20 via a cellular base station (e.g., the network access node 16-1) or a computer network access point (e.g., the network access node 16-2), respectively. In either case, the request is routed through a network access node 16 to the resources manager 20. In some embodiments, the request may include the estimated geographic location of the handheld device 12, preferences for one or more communications resources, and/or constraints.

In step 306, the resource manager 20 can identify and select one or more communications resources from the remote database 30. The resources manager 20 may use the estimated geographic location to identify locally available communications resources and select a suitable communications resource based on the preferences or constraints included in the request from the handheld device 12. For example, the resources manager 20 may identify all service providers 18 that are available locally to the handheld device 12 and select the service provider that has a suitable QoS or cost of use, if indicated in the request from the handheld device.

Alternatively, in step 308, the handheld device 12 can identify and select the communications resource(s) from the local database 28. Accordingly, in step 310, the handheld device 12 can optionally request the selected communications resource(s) from the resources manager 20. For example, the handheld device 12 can identify local service providers and select the most suitable service provider. The handheld device 12 can then retrieve a suitable eSIM from the local database 28 or request for the eSIM from the remote database 30.

In step 312, the resources manager 20 can provide the selected communications resource(s) to the handheld device 12 over a network. For example, the resources manager 20 can provide an eSIM or designate a suitable protocol, frequency band, or frequency optimized for a geographic location and other selected values (e.g., optimal cost of use) that can be used to subsequently configure the handheld device 12.

In step 314, the handheld device 12 configures (or reconfigures) the communications circuitry 24 and/or the antenna elements 26 for the selected communications resource(s). For example, the handheld device 12 can activate the eSIM for a service provider selected from the available local service providers. Each local service provider has an eSIM required for accessing the network(s) 14. Moreover, the configuration can include loading or turning the communications circuitry 24 and/or the antenna elements 26 in accordance with the selected communications resource(s).

In some embodiments, the antenna elements 26 can be separately or collectively addressable by software to configure the antenna elements to operate in accordance with the selected communications resource(s). For example, the antenna elements 26 can operate as diversity elements for a diversity antenna under the control of the communications circuitry 24 to perform automatic switching of the plurality of diversity elements based on the estimated geographic location of the handheld device. Moreover, the plurality of antenna elements can be configured to operate in accordance with different forms of antennas including a Yagi configuration.

Accordingly, access to network(s) 14 is enabled by utilizing the communication circuitry 24 and the antenna elements 26 as configured in accordance with the selected communications resource(s). Lastly, in step 316, the handheld device 12 can establish wireless communications to the network(s) 14 in accordance with the selected communications resource(s).

Figure 4:
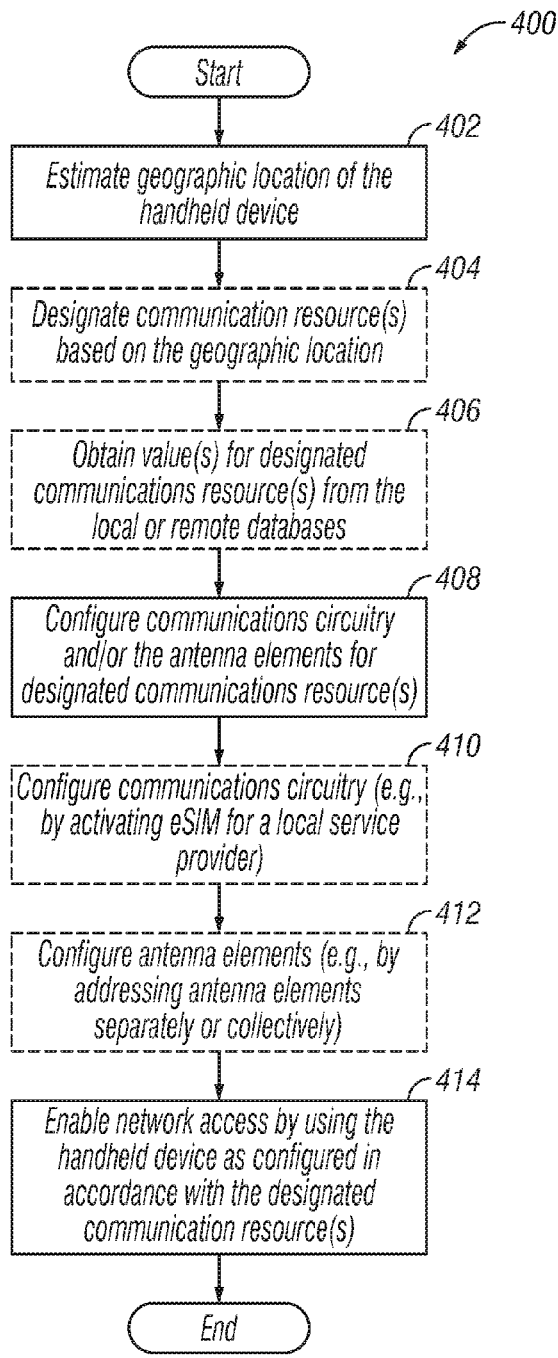
FIG. 4 is a flowchart illustrating a method performed by a handheld device for configuring the handheld device in accordance with one or more designated communications resources according to some embodiments of the present disclosure.

FIG. 4 is a flowchart illustrating a method 400 performed by the handheld device 12 for configuring the handheld device 12 in accordance with one or more designated communications resources according to some embodiments of the present disclosure. In step 402, the handheld device 12 can estimate its geographic location. For example, the geographic location can be estimated from GPS signals transmitted by the satellite(s) 22.

In step 404, the handheld device 12 can optionally designate communications resource(s) based on the estimated geographic location. For example, the handheld device 12 or the resources manager 20 can identify locally available communications resource(s) such as local service providers, protocols, frequency bands, or frequencies. The communications resource(s) can be identified from the local database 28 or the remote database 30, respectively.

The handheld device 12 or the resources manager 20 can then select optimal communications resource(s) from among the identified communications resource(s) based on, for example, a local data rate, QoS, or cost for using a desired communications service. The handheld device 12 designates the selected communications resource(s) for configuring the handheld device 12 to subsequently enable access to the network(s) 14. In step 406, the handheld device 12 can optionally obtain one or more value(s) for the designated communications resource(s) from the local database 28 or the remote database 30 over a communications network.

In step 408, the handheld device 12 configures the communications circuitry 24 and/or the antenna elements 26 for the designated communications resource(s). For example, a designated communications resource can be a local service provider and its value is a corresponding eSIM. Accordingly, in optional step 410, the handheld device 12 can configure the communications circuitry 24 by activating the eSIM to enable access to the network(s) 14 by using the local service provider.

In optional step 412, for example, the handheld device 12 can configure the antenna elements 26 by separately or collectively addressing them to operate in accordance with the designated communications resource(s). For example, the antenna elements 26 can be configured to operate as diversity elements of a diversity antenna under control of the communications circuitry 24 to perform automatic switching of diversity elements, and/or to operate in accordance with an antenna form such as Yagi.

In step 414, the handheld device 12 is enabled to access to the network(s) 14 by using the communication circuitry 24 and the antenna elements 26 as configured in accordance with the designated communication resource(s). As such, the handheld device 12 can be optimally configured in accordance with local communications resource(s) to access the network(s) 14 for wireless communications.

Figure 5:
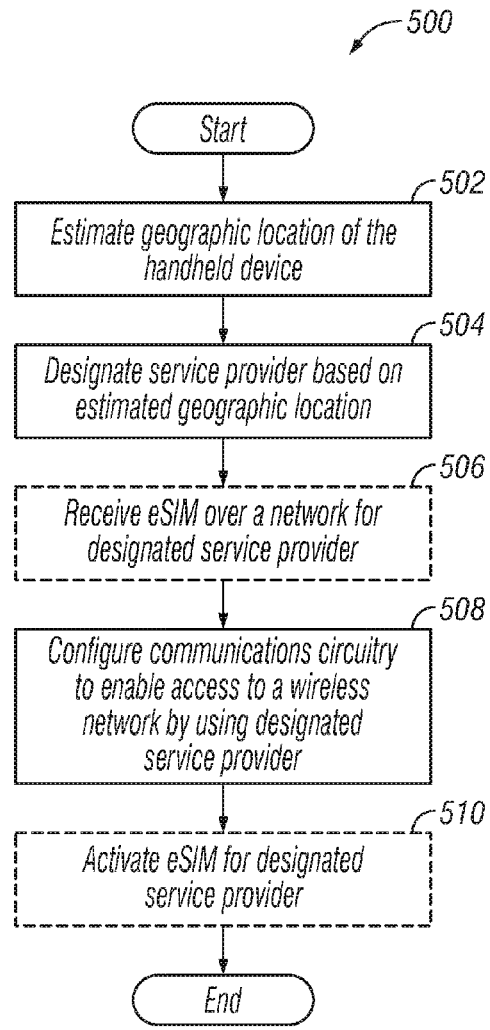
FIG. 5 is a flowchart illustrating a method performed by a handheld device for enabling access to a wireless network by using a designated service provider according to some embodiments of the present disclosure.

FIG. 5 is a flowchart illustrating a method 500 performed by the handheld device 12 for enabling access to the network(s) 14 by using a designated service provider according to some embodiments of the present disclosure. In step 502, the handheld device 12 estimates its geographic location. For example, the geographic location can be estimated from GPS signals transmitted by the satellite(s) 22.

In step 504, the handheld device 12 designates a service provider based on the estimated geographic location. For example, the handheld device 12 or the resources manager 20 can identify locally available service providers and select a service provider from among the identified services providers based on a QoS or cost of use. The selected service provider is designated by the handheld device 12 to enable access to the network(s) 14.

In step 506, the handheld device 12 optionally receives an eSIM for the designated service provider over a network. For example, the remote database 30 of the resources manager 20 can store an eSIM for each locally available service provider. The resources manager 20 can select the locally available service provider and transmit the corresponding eSIM to the handheld device 12 over a network.

In step 508, the handheld device 12 is configured (or reconfigured) to enable access to the network(s) 14 by employing a service of the designated service provider. In particular, the communications circuitry 24 and/or the antenna elements 26 of the handheld device 12 is configured (or reconfigured) to access network(s) 14 by employing a service of the designated service provider. For example, in step 510, the communications circuitry 24 is configured for the designated service provider by activating the eSIM for the designated service provider received from the resources manager 20. As such, the handheld device 12 can access the network(s) 14 for wireless communications by using an optimal service provider.

Figure 6:
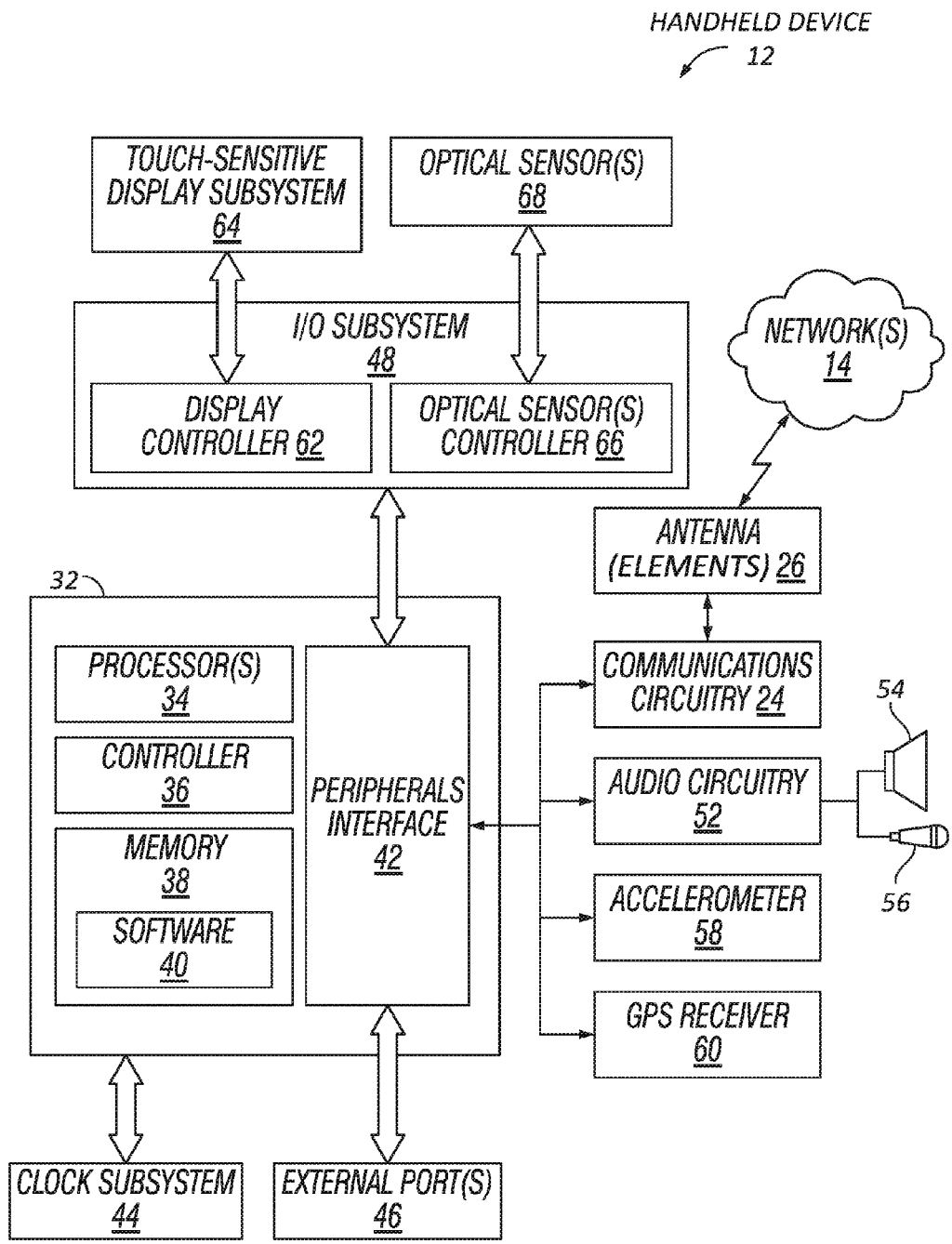
FIG. 6 is a block diagram illustrating components of the handheld device according to some embodiments of the present disclosure.

FIG. 6 is a block diagram illustrating components of the handheld device 12 according to some embodiments of the present disclosure. The handheld device 12 may include generic components and/or components specifically designed to carry out the disclosed technology. The handheld device 12 may be a standalone device or part of a distributed system that spans networks, locations, machines, or combinations thereof. For example, components of the handheld device 12 may be included in or coupled to a system-on-chip (SOC), a single-board computer (SBC) system, a desktop or laptop computer, a kiosk, a mainframe, a mesh of computer systems, or combinations thereof.

In some embodiments, the handheld device 12 can operate as a server device or a client device in a client-server network environment, or as a peer machine in a peer-to-peer system. In some embodiments, the handheld device 12 may perform one or more steps of the disclosed embodiments in real-time, near real-time, offline, by batch processing, or combinations thereof.

The handheld device 12 includes a processing subsystem 32 that includes one or more processors 34 (e.g., Central Processing Units (CPUs), Application Specific Integrated Circuits (ASICs), and/or Field Programmable Gate Arrays (FPGAs)), a memory controller 36, memory 38 that can store software 40, and a peripherals interface 42. The memory 38 may include volatile memory (e.g., random-access memory (RAM)) and/or non-volatile memory (e.g., read-only memory (ROM)). The memory 38 can be local, remote, or distributed. The handheld device 12 can also include a clock subsystem 44 that controls a timer for use in some embodiments. The components of the handheld device 12 are interconnected over a bus (not shown) operable to transfer data between hardware components.

The peripherals interface 42 is coupled to one or more external ports 46, which can connect to an external power source, for example. The peripherals interface 42 is also coupled to an I/O subsystem 48. Other components coupled to the peripherals interface 42 include communications circuitry 24, audio circuitry 52 for a speaker 54 and a microphone 56, an accelerometer 58, a GPS receiver 60 (or Global Navigation Satellite System (GLONASS) or other global navigation system receiver), and other sensors (not shown). The GPS receiver 60 is operable to receive signals concerning the geographic location of the handheld device 12. The accelerometer 58 can be operable to obtain information concerning the orientation (e.g., portrait or landscape) of handheld device 12.

The I/O subsystem 48 includes a display controller 62 operative to control a touch-sensitive display system 64, which further includes the touch-sensitive display of the handheld device 12. The I/O subsystem 48 also includes an optical sensor(s) controller 66 for one or more optical sensors 68 of the handheld device 12. The I/O subsystem 48 includes other components (not shown) to control physical buttons such a "home" button.

Figure 7:
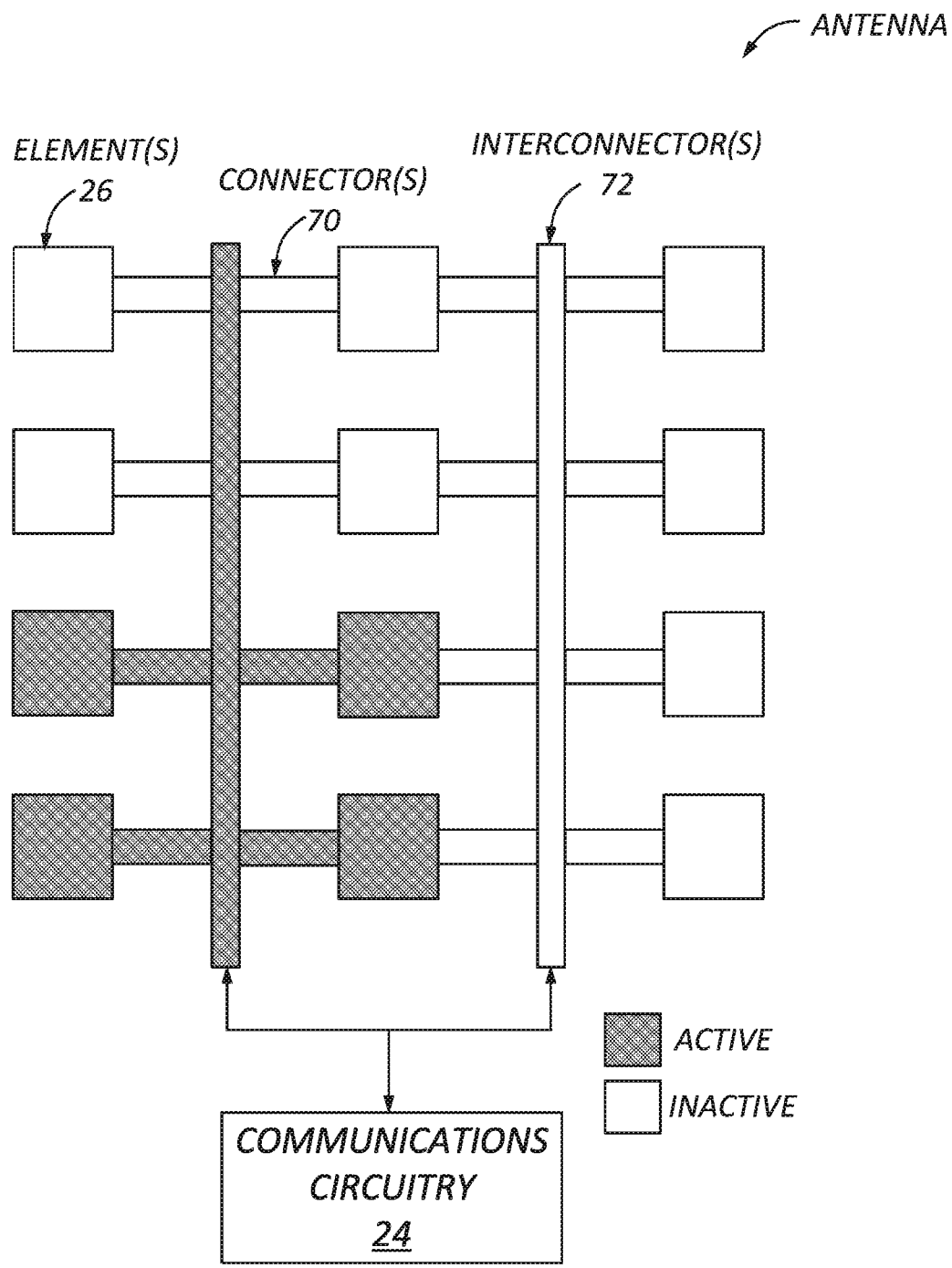
FIG. 7 is a block diagram illustrating a configurable antenna formed of several discrete antenna elements that are separately and/or collectively addressable to operate with designated communications resource(s) according to some embodiments of the present disclosure.

The communications circuitry 24 can configure or reconfigure the antenna(s) of the handheld device. For example, FIG. 7 is a block diagram illustrating a configurable antenna formed of several discrete antenna elements 26 that are separately and/or collectively addressable to operate with designated communications resource(s) according to some embodiments of the present disclosure. Specifically, the antenna shown in FIG. 7 is formed of a combination of components including the antenna elements 26 that can couple to connectors 70, which can couple to interconnectors 72.

In some embodiments, the antenna elements 26 can be structurally integrated with the handheld device 12 (e.g., embedded in the housing or display screen) or, for example, coupled to the handheld device 12 through the external ports 46. The communications circuitry 24 can convert electrical signals to/from electromagnetic signals that are communicated by the antenna elements 26 to network(s) 14 or other devices. For example, the communications circuitry 24 can include radio frequency (RF) circuitry that processes RF signals communicated by the antenna elements 26.

In some embodiments, the antenna elements 26 can be programmatically controlled via the communications circuitry 24. For example, the software 40 may control or contribute to the configuration of the antenna elements 26 via the communications circuitry 24. For example, the memory 38 may include the local communications resources database 28 used by the software 40 to configure (or reconfigure) the communications circuitry 24 or antenna elements 26. The software 40 can be located anywhere in the handheld device 12 or located remotely and communicatively coupled over a network to the handheld device 12. For example, the software 40 can be in a memory of the resources manager 20 and remotely configure the communications circuitry 24 and/or antenna elements 26.

As indicated above, in some embodiments, the antenna elements 26 can be separately or collectively addressable by the communications circuitry 24 to configure the antenna of the handheld device 12 to operate in accordance with selected communications resource(s). The communications circuitry 24 can selectively activate, deactivate, or actively switch any combination of the antenna components to achieve a desired antenna and/or behavior. For example, in the illustrated embodiment, some of the antenna elements 26, connectors 70, and interconnectors 72 are active, while others are not. The coupled active antenna elements 26 form an antenna for transmitting and/or receiving wireless communication signals.

For example, the antenna elements 26 can operate as diversity elements for a diversity antenna under the control of the communications circuitry 24 to perform automatic switching of the plurality of diversity elements based on the estimated geographic location of the handheld device. In another example, a combination of the antenna elements 26 can be activated to form omnidirectional, directional (e.g., Yagi), or many other types of antennas known to persons skilled in the art and not described herein for brevity. Further, for example, a particular combination of antenna elements 26 can be activated to adjust for an impedance value, to tune for a particular resonant frequency, to match an antenna load, to operate in accordance with a particular protocol, etc. In some embodiments, a feedback loop (not shown) could be used to configure (or reconfigure) the combination of active antenna components (e.g., based on a signal strength).

The communications circuitry 24 can include circuitry for performing well-known functions such as an RF transceiver, one or more amplifiers, a tuner, oscillators, a digital signal processor, a CODEC chipset, a subscriber identity module (SIM card or eSIM), and so forth. The communications circuitry 24 may communicate wirelessly via the antenna elements 26 with the network(s) 14 (e.g., the Internet, an intranet and/or a wireless network, such as a cellular network, a wireless local area network (LAN) and/or a metropolitan area network (MAN)) or other devices.

The software 40 can include an operating system (OS) software program, application software programs, and/or modules such as a communications module, a GPS module, and the like. For example, the GPS module can estimate the location of the handheld device 12 based on the GPS signals received by the GPS receiver 60. The GPS module can provide this information to components of the handheld device 12 for use in various applications (e.g., to provide location-based access to service providers 18).

A software program, when referred to as "implemented in a computer-readable storage medium," includes computer-readable instructions stored in the memory (e.g., memory 38). A processor (e.g., processor 34) is "configured to execute a software program" when at least one value associated with the software program is stored in a register that is readable by the processor. In some embodiments, routines executed to implement the disclosed embodiments may be implemented as part of OS software (e.g., Microsoft Windows® and Linux®) or a specific software application, component, program, object, module, or sequence of instructions referred to as "computer programs."

Computer programs typically comprise one or more instructions set at various times in various memory devices of a computing device (e.g., handheld device 12), which, when read and executed by at least one processor (e.g., processor 34), will cause the handheld device 12 to execute functions involving the disclosed embodiments. In some embodiments, a carrier containing the aforementioned computer program product is provided. The carrier is one of an electronic signal, an optical signal, a radio signal, or a non-transitory computer-readable storage medium (e.g., the memory 38).

Operation of a memory device (e.g., memory 38), such as a change in state from a binary one (1) to a binary zero (0) (or vice versa) may comprise a visually perceptible physical change or transformation. The transformation may comprise a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

The handheld device 12 may include other components that are not shown nor further discussed herein for the sake of brevity. One having ordinary skill in the art will understand any hardware and software that is included but not shown in FIG. 6. While embodiments have been described in the context of fully functioning handheld devices, those skilled in the art will appreciate that the various embodiments are capable of being distributed as a program product in a variety of forms and that the disclosure applies equally, regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

The invention claimed is:

1. A handheld device comprising:
a plurality of antenna elements; and
a housing including:
a processor;
communications circuitry communicatively coupled to the plurality of antenna elements and the processor; and
memory including instructions executable by the processor causing the handheld device to:
estimate a geographic location of the handheld device based on one or more positioning signals received by the handheld device without establishing a bidirectional communications link between the handheld device and a base station or access point of any communications network;
select a communications resource from among a plurality of communications resources stored in a memory of the handheld device or stored in a remotely located database accessible over a non-cellular communications network,
the communications resource being selected based on (a) the geographic location of the handheld device and (b) a data rate, quality of service, or cost of service associated with using a cellular network of a plurality of cellular networks providing cellular coverage in a geographic region including the geographic location of the handheld device;
configure the communications circuitry and the plurality of antenna elements in accordance with the communications resource such that the handheld device is enabled to communicate while in the geographic region including the geographic location of the handheld device over the cellular network by using the communications circuitry and the plurality of antennas as configured in accordance with the communications resource and based on internally stored information of local laws or regulations which provides limits on use of protocols, bands, frequencies, or types or degrees of encryption for communications by the handheld device; and
establish a bidirectional communications link via a base station of the cellular network to another handheld device by utilizing the communication circuitry and the plurality of antenna elements as configured in accordance with the communications resource.

2. The handheld device of claim 1, wherein the communications resource is any of a wireless communications service provider, a protocol, a frequency band, or a frequency.

3. The handheld device of claim 2, wherein the communications resource is a wireless communications service provider and the value is an electronic subscriber identification module, eSIM, and to enable access to the wireless network comprises causing the handheld device to: activate the eSIM for the wireless communications service provider selected from a plurality of wireless communications service providers each having a respective eSIM required for accessing a wireless communications network by the handheld device.

4. The handheld device of claim 3, wherein the eSIM is retrieved from the remote database by the handheld device over a communications network.

5. The handheld device of claim 1, wherein to configure at least one of the communications circuitry or the antenna elements includes loading or tuning the communications circuitry or the antenna elements in accordance with the selected communications resource.

6. The handheld device of claim 1, wherein the plurality of antenna elements are separately or collectively addressable to configure the antenna elements to operate in accordance with the selected communications resource.

7. The handheld device of claim 1, wherein the plurality of antenna elements is a plurality of diversity elements operable under the control of the communications circuitry to perform automatic switching of the plurality of diversity elements based on the geographic location of the handheld device.

8. The handheld device of claim 1, wherein the plurality of antenna elements are configurable to operate in accordance with a plurality of antenna forms including a Yagi antenna.

9. The handheld device of claim 1, wherein the plurality of antenna elements are integrated with the housing of the handheld device.

10. A method performed by a handheld device including a housing, a plurality of antenna elements communicatively coupled to communications circuitry, a processor, and a memory collectively operable to enable access to a wireless network, the method comprising:
estimating a geographic location of the handheld device based on one or more positioning signals received by the handheld device without establishing a bidirectional communications link between the handheld device and a base station or access point of any communications network, thereby providing an estimated geographic location;
selecting a communications resource from among a plurality of communications resources stored in a memory of the handheld device or stored in a remotely located database accessible over a non-cellular communications network, the communications resource being selected based on (a) the geographic location of the handheld device and (b) a data rate, quality of service, or cost of service associated with using a cellular network of a plurality of cellular networks providing cellular coverage in a geographic region including the geographic location of the handheld device;
configuring the communications circuitry and the plurality of antenna elements in accordance with the communications resource such that the handheld device is enabled to communicate while in the geographic region including the estimated geographic location of the handheld device over the cellular network by using the communications circuitry and the plurality of antennas as configured in accordance with the communications resource and based on internally stored information of local laws or regulations which provides limits on use of protocols, bands, frequencies, or types or degrees of encryption for communications by the handheld device; and
establish a bidirectional communications link via a base station of the cellular network to another handheld device by utilizing the communication circuitry and the plurality of antenna elements as configured in accordance with the communications resource.

11. The method of claim 10, wherein the communications resource is any of a wireless communications service provider, a protocol, a frequency band, or a frequency.

12. The method of claim 11, wherein the communications resource is a wireless communications service provider and the value is an electronic subscriber identification module, eSIM, the method further comprising:
configuring the communications circuitry by activating the eSIM to enable access to the wireless network by employing a service of the wireless communications service provider.

13. The method of claim 10, further comprising:
separately or collectively addressing the antenna elements to configure the antenna elements to operate in accordance with the communications resource.

14. A method performed by a handheld device including a housing, a processor, a memory, and communications circuitry communicatively coupled to the processor and memory to enable access to a wireless network, the method comprising:
estimating a geographic location of the handheld device based on one or more positioning signals received by the handheld device without establishing a bidirectional communications link between the handheld device and a base station or access point of any communications network thereby providing an estimated geographic location;
selecting a communications resource from among a plurality of communications resources stored in a memory of the handheld device or stored in a remotely located database accessible over a non-cellular communications network, the communications resource being selected based on (a) the geographic location of the handheld device and (b) a data rate, quality of service, or cost of service associated with using a cellular network of a plurality of cellular networks providing cellular coverage in a geographic region including the geographic location of the handheld device;
designating a wireless communications service provider from among a plurality of wireless communications service providers based on (a) the estimated geographic location of the handheld device and (b) a data rate, quality of service, or cost of service associated with using a cellular network of a plurality of cellular networks providing cellular coverage in a geographic region including the geographic location of the handheld device, thereby providing a designated wireless communications service provider; and
configuring the communications circuitry to enable access to the wireless network by employing a service of the designated wireless communications service provider, wherein the configuring is based on internally stored information of local laws and regulations which provides limits on use of protocols, bands, frequencies, or types or degrees of encryption for communications by the handheld device.

15. The method of claim 14, wherein configure the communications circuitry comprises:
activating an electronic subscriber identification module, eSIM, for the designated wireless communications service provider, wherein each of the plurality of wireless communications service providers has a respective eSIM required for enabling access to a wireless network by the handheld device.

16. The method of claim 15, wherein each eSIM card for each of the plurality of wireless communications service providers is stored in the database located in a server remote from the handheld device, the method further comprising, prior to activating the eSIM for the selected wireless communications service provider:

receiving the eSIM for the selected wireless communications service provider over a communications network from the server remote from the handheld device.

* * * * *